E. E. WAITE.
CLUTCH RING.
APPLICATION FILED MAR. 20, 1915.

1,292,666.

Patented Jan. 28, 1919.

Witnesses:
J. H. McCready
S. P. Marsh

Inventor:
Edwin E. Waite
By his attorneys
Putnam Putnam & Bell

UNITED STATES PATENT OFFICE.

EDWIN E. WAITE, OF FRAMINGHAM, MASSACHUSETTS, ASSIGNOR OF ONE-HALF TO STANDARD WOVEN FABRIC COMPANY, OF FRAMINGHAM, MASSACHUSETTS, A CORPORATION OF MASSACHUSETTS.

CLUTCH-RING.

1,292,666.	Specification of Letters Patent.	Patented Jan. 28, 1919.

Application filed March 20, 1915. Serial No. 15,943.

*To all whom it may concern:*

Be it known that I, EDWIN E. WAITE, a citizen of the United States, residing at Framingham, in the county of Middlesex and State of Massachusetts, have invented certain new and useful Improvements in Clutch-Rings, of which the following description, in connection with the accompanying drawings, is a specification, like reference characters on the drawings indicating like parts in the several figures.

This invention relates to brakelinings and clutch rings, or disks, and particularly to friction rings of the character used in multiple disk clutches and brakes. For convenience such rings will hereinafter be referred to as clutch rings. It is usual to fix to the disks of a brake of this type a facing of brakelining which may be made, for instance, from asbestos fabric treated in some manner designed to give it the required coefficient of friction and to increase its wearing qualities. Frequently also a flat ring, or disk, of similar material is inserted loosely between the disks of the clutch, forming what is usually termed a "floating ring." These disks, or rings, may either be cut or died out of a sheet of fabric or made from a strip of fabric woven to the required width and molded into the form of a flat ring. The latter method produces a better ring for the reason that it provides two selvage edges around the entire ring. The joining of the ends of this strip, however, to complete the ring presents special difficulties since the ring is subjected while it is in use to severe strains tending to open the joint and thus destroy the usefulness of the ring. The usual practice has been to unite the ends of the strip by fastenings so inserted that they either wear rapidly while in use and thus break after a short time, or they are so arranged as to bend, when an unusual strain is placed upon them, sufficiently to allow the joint to open. The present invention aims to devise a simple and inexpensive means for joining the ends of the strip which will avoid the objections heretofore experienced.

Referring now to the accompanying drawings.

Figure 1:
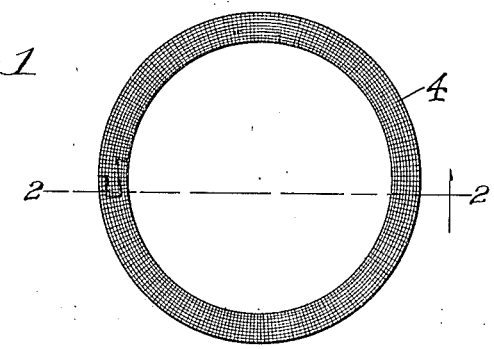
Figure 1 is a plan view of a clutch ring embodying this invention.
Figure 2:
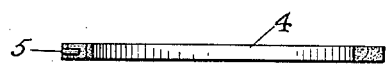
Fig. 2 is a sectional view on the line 2—2 of Fig. 1.
Figure 3:
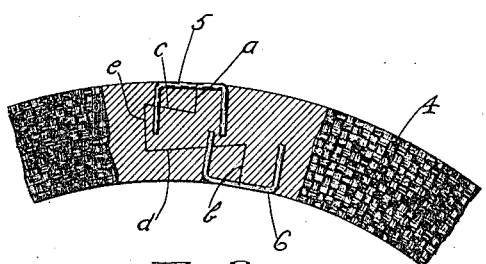
Fig. 3 is a sectional view on a large scale showing more clearly the joint in the ring shown in Fig. 1 and the manner in which the ends of the ring are fastened together.

In the drawings, 4 indicates a brake band which may be made of any suitable material, such as a narrow strip of asbestos fabric, properly treated, and molded into the form of a ring. The ends of this strip are cut to form, when connected together, a dove-tail joint, as best shown in Fig. 3. This joint consists of two end portions $a$ and $b$, respectively, which extend substantially radially of the ring, and parts $c$, $d$ and $e$ that connect the parts $a$ and $b$, the parts $c$ and $d$ lying substantially parallel to the edges of the ring 4 and the part $e$ connecting the two adjacent ends of the parts $c$ and $d$ and extending radially of the ring. Preferably the end portions $a$ and $b$ of the joint are offset with relation to each other. The cuts made in the end portions of the ring for the purpose of giving them the required shapes extend transversely of the width of the ring so that, when the two ends are overlapped, the part of the ring at the joint has the same dimensions as the other portions of the ring.

Two fastenings 5 and 6, in this instance consisting of staples, are inserted, respectively, in the opposite edges of the ring 4, the staple 5 straddling the end $a$ of the joint and the staple 6 spanning the end $b$. As clearly shown in Fig. 3, one of the legs of the staple 5 extends through one end portion of the ring 4, crossing the part $c$ of the joint inside the ring, and then extends into the other end of the ring. Similarly, one leg of the staple 6 extends through one end portion of the ring, crossing the part $d$ of the joint within the ring and then projects into the other end of the ring. Since the parts $c$ and $d$ of the joint extend substantially parallel to the edges of the ring, the strain on the ring while it is in use, tending to open the joint, will tend to shear off the legs of the staples where they cross the parts $c$ and $d$ of the joint. In other words, the strain tending to open the joint is exerted in a direction substantially parallel to the parts $c$ and $d$ of the joint thus tending to slide one end portion of the ring relatively to the other along the lines of cut $c$ and $d$ and this tendency is resisted by the shearing strength of the legs of the staples where they cross the parts $c$ and $d$. The dove-tail shape of the joint also is useful in resisting this force. The material of which these rings are made is very firm and staples can readily be used of sufficient size to effectually resist this shearing action. Furthermore, the tendency to open the joint at its ends $a$ and $b$ is resisted by the tensile strength of the bridge portions of the staples. When the ring is made from a narrow strip of brakelining fabric, the selvage edges afford a very firm anchorage for the staples. This arrangement has the advantage of permitting the use of relatively small fastenings inserted in such a manner that their maximum strength is utilized. At the same time, they are so positioned that they cause no inconvenience in handling or using the ring and are not subjected to the wear of adjacent parts of the clutch.

Figure 4:
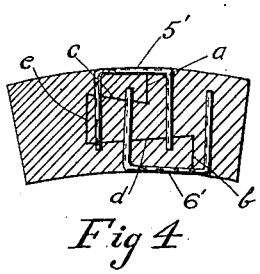
Fig. 4 is a view similar to Fig. 3 of a slightly different construction.

In the construction shown in Fig. 4 longer staples are used than in the arrangement shown in Fig. 3, and the staples are so inserted that both legs of the staple 5', corresponding to the staple 5 in Fig. 3, extend across the part $d$ of the joint, one of these legs also extending across the part $c$, as in Fig. 3. In this arrangement also one leg of the staple 6' extends across both of the parts $c$ and $d$ of the joint. This arrangement, therefore, has the advantage of presenting more metal where it must be sheared off in order to open the joint.

A ring of the above constructions may be used either as a facing for a metal ring or as a floating ring. While the ring has been referred to in this specification and in the claims as a clutch ring, this designation has been adopted for purposes of convenience rather than limitation. It is obvious that the joint could be used for other purposes than in a clutch ring and such uses are regarded as coming within the scope of the appended claims.

Having thus described my invention, what I claim as new and desire to secure by Letters Patent of the United States is:

1. A clutch ring having end portions connected together with a part of the joint between said ends extending substantially parallel to the edges of the ring, and fastenings inserted in said ring having parts extending across said parallel portion of the joint within the ring whereby the strain tending to open the joint tends to shear off the fastenings.

2. A clutch ring having end portions shaped and connected together to form a joint, said joint having ends at opposite edges of the ring and having an intermediate part conecting the two ends of said joint, and fastenings inserted in the opposite edges of said ring straddling, respectively, the ends of the joint at the opposite edges of the ring and each having a part extending, within the ring, across said intermediate connecting part of said joint.

3. A clutch ring having end portions connected together to form a joint between them, said joint having its ends at opposite edges of the ring offset with relation to each other and having an intermediate part connecting the two ends of said joint, and fastenings inserted in the opposite edges of the ring and extending, within the ring, across said intermediate connecting part of said joint.

4. A clutch ring having end portions shaped and connected together to form a joint having ends at opposite edges of the ring and parts connecting said ends extending substantially parallel to the edges of said ring, fastenings inserted in the opposite edges of said ring and straddling, respectively, the ends of said joint, each fastening having a part extending through one end portion of the ring and into the other end portion and crossing one of said connecting parts of the joint inside the ring.

5. A clutch ring having end portions cut transversely of the width of the ring to form parts shaped to overlap each other and form a jointed portion of the same dimensions as the other portions of the ring, and two staples inserted, respectively, in opposite edges of the ring straddling the respective ends of the joint between the ends of the ring and each having a part extending through one end portion of the ring and into the other end portion.

6. A clutch ring having end portions shaped to fit together and form a dove-tail joint between them with the ends of the joint at opposite edges of the ring offset with relation to each other, and two staples inserted, respectively, in opposite edges of the ring and straddling the respective ends of the said joint, each of said staples having one leg crossing, within the ring, a portion of the joint that extends substantially parallel to the edges of the ring.

7. A clutch ring having end portions connected by a dove-tail joint, portions of said joint extending substantially parallel to the edges of the ring, and two staples inserted, respectively, in opposite edges of the ring and straddling the respective ends of said joint, each of said staples having one leg crossing both of said parallel portions of the joint inside the ring.

8. A clutch ring of the character described having end portions shaped to fit together and form a joint between said portions, said joint having ends at the opposite edges of the ring and an intermediate portion extending substantially parallel to the direction of the force to which the ring is subjected while in use and which tends to open the joint, and fastenings inserted in opposite edges of the ring and spanning, respectively, the ends of said joint and crossing said intermediate part of the joint inside the ring whereby the fastenings resist said force both by shearing and tensile strength.

9. A clutch ring of the character described having end portions shaped to fit together and form a joint between said portions, said joint having ends at the opposite edges of the ring and an intermediate portion extending substantially parallel to the direction of the force to which the ring is subjected while in use and which tends to open the joint, and a fastening inserted in the ring and extending across said intermediate portion of the joint inside the ring whereby said force is resisted by the shearing strength of said fastening.

10. A ring of the character described having end portions shaped to fit together and form a joint between said portions, said joint having ends at the opposite edges of the ring and an intermediate portion extending substantially parallel to the edges of the ring, and a fastening inserted in the ring spanning said joint and crossing said intermediate portion inside the ring.

11. An interrupted clutch ring having frictional faces and a fastening device for the ends of the ring projecting therein and located away from said faces.

12. An interrupted clutch ring having frictional side faces and fastening means for the ends of the ring entered into the edge of the latter away from said faces.

In testimony whereof I have affixed my signature, in presence of two witnesses.

EDWIN E. WAITE.

Witnesses:
 JOSEPH E. HAYES,
 F. RAYMOND DRAPER.